No. 875,694. PATENTED JAN. 7, 1908.
H. F. CRANDALL.
FISHING REEL.
APPLICATION FILED APR. 8, 1907.
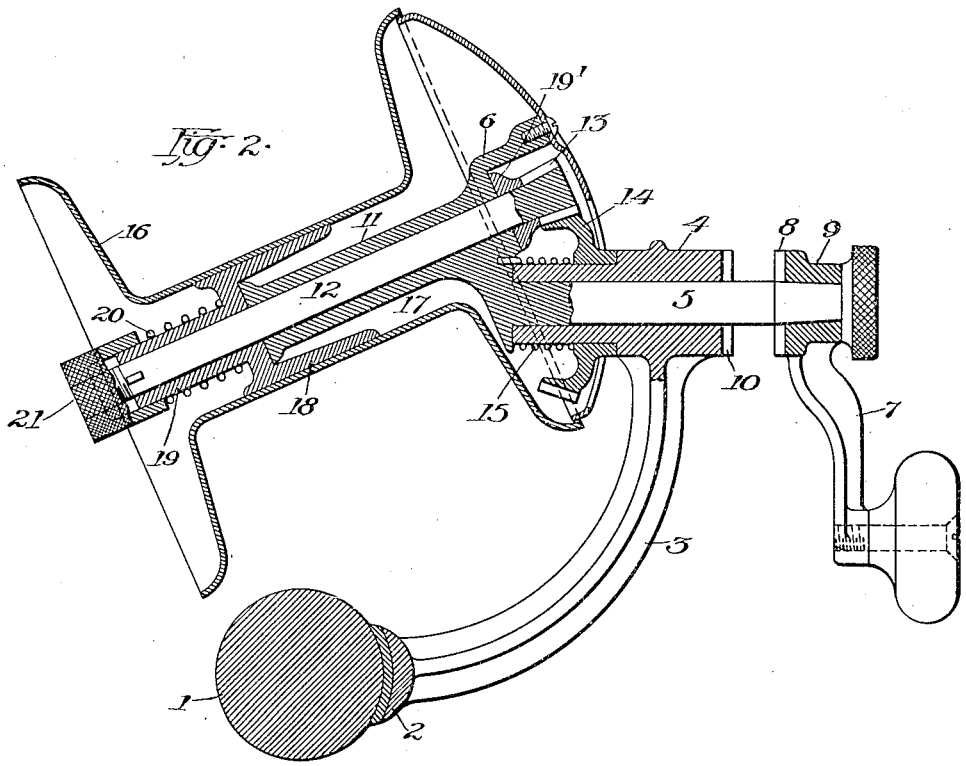
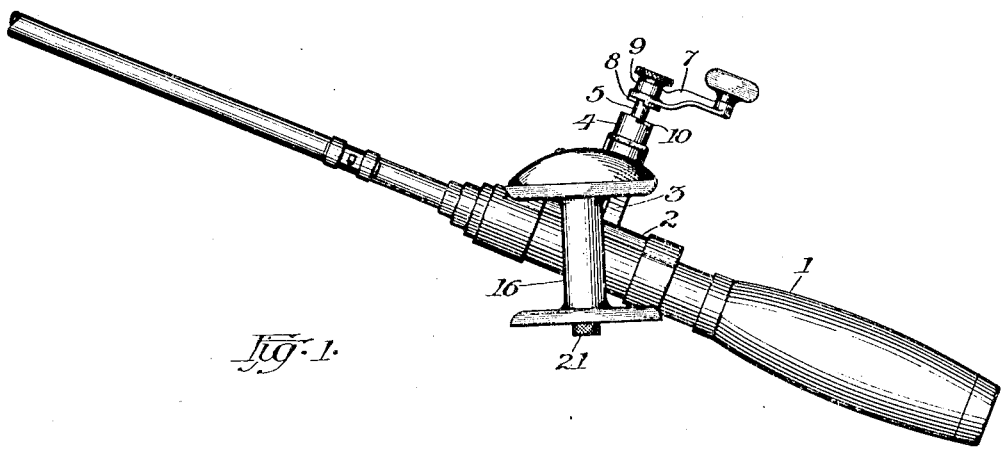
Witnesses:
J. N. Daggett
F. W. Hoffmeister
Inventor:
Henry F. Crandall.
By E. W. Burgess
Attorney

UNITED STATES PATENT OFFICE.

HENRY F. CRANDALL, OF MILWAUKEE, WISCONSIN.

FISHING-REEL.

No. 875,694.  Specification of Letters Patent.  Patented Jan. 7, 1908.

Application filed April 8, 1907. Serial No. 366,931.

*To all whom it may concern:*

Be it known that I, HENRY F. CRANDALL, a citizen of the United States, residing at Milwaukee, in the county of Milwaukee and State of Wisconsin, have invented certain new and useful Improvements in Fishing-Reels, of which the following is a specification.

My invention relates to fishing reels designed to be secured to the butt end of a casting rod and operative to reel in the line and also allow the same to unwind therefrom during the operation of casting or otherwise as desired.

The object of the invention is to provide a reel with a spool and means that will automatically operate, during its winding movement, to cause it to rotate at varying angles relative to its support in a manner to cause the line to traverse from end to end thereof in orderly arrangement so as to insure a safe and certain unwinding of the same without danger of becoming snarled as the line is rapidly delivered therefrom. I attain these objects by the mechanism illustrated in the accompanying drawing, in which—

Figure 1 is a view of part of a casting rod having my improved reel mounted thereon; and Fig. 2 is an enlarged in part sectional elevation showing the details of the mechanical construction of the device.

The same reference numerals designate like parts throughout the several views.

1 represents the butt piece of an ordinary casting rod, and 2 a common form of releasable clamping mechanism operative to connect the reel with the rod, 3 a laterally and upwardly curved arm provided with a sleeve portion 4 at its upper end. The sleeve is arranged transversely of the rod, and journaled therein is a spindle 5, forming part of a spool carrying member 6. The spindle is adapted to slide longitudinally relative to the sleeve, and secured to its outer end, in any preferred manner, is a crank 7, having clutch teeth 8 formed on the inner end of its hub portion 9 that are adapted to engage with corresponding clutch teeth 10 formed upon the outer end of the sleeve 4 when the spindle is caused to slide in a manner to bring the teeth into engagement.

The spool carrying member 6 is provided with a sleeve portion 11 angularly disposed relative to the spindle 5, and journaled therein is a spool spindle 12, having a pinion 13 integral therewith.

14 is a gear secured to the inner end of the sleeve 4 coaxially with the spindle 5, and pinion 13 is adapted to mesh therewith and be rotated thereby when the spool carrying member is rotated orbitally thereabout; the gearing being a common form of planetary type. The sleeve 5 projects inwardly beyond the gear 14, and surrounding the same is a spring 15, operative between the hub of the gear and the spool supporting member in a manner to slide its spindle through the sleeve and disengage the pinion 13 from the gear.

The spool 16 is provided with an axial bore 17, and secured therein is a shell 18, having a reduced sleeve portion 19 that is slidably secured to the outer end of the spindle 12, and the inner end of the sleeve within the shell portion contacts with the end of the sleeve 11 and the spindle is yieldingly pressed in a longitudinal direction to cause washer $19^1$ to press against the opposite end of the sleeve by means of a spring 20 surrounding the sleeve 19 and operative between the shell portion and a nut 21 threaded upon the outer end of the spindle 12; the nut operating to govern the degree of pressure of the spring in the well-known way.

In its preferred form the axis of the spool is arranged at such an angle relative to the axis of the spindle 5 that if a line representing the latter be projected it would intercept a line representing the former substantially midway between the ends of the spool; the result of such arrangement being that as the spool carrying member is rotated orbitally about its support the opposite ends of the spool will be given a gyratory movement, the center of gyration coinciding with the point of intersection of the axes of the spindles, or the point of intersection represents the apexes of conical planes described by the axis of the spool as it is rotated.

In the form shown the proportion of the gears is as four to one, but it may be changed, as also the relative angularity of the axes of the spindles, without departing from the spirit of my invention. When the spool carrying member moves laterally in a manner to disengage the gear members, the spool is free to rotate about its axis, controlled by the friction caused by the spring 20, and the carrying member is locked against rotation by engagement of the clutch members.

What I claim as being my invention and desire to secure by Letters Patent, is:

1. A fishing reel comprising, in combination, a spool, means whereby it may be rotated both axially and orbitally, and means whereby the orbital rotation thereof may be suspended.

2. A fishing reel comprising, in combination, a spool, means whereby it may be rotated both axially and in a conical orbit, and means whereby the conical-orbital rotation thereof may be suspended.

3. A fishing reel comprising, in combination, a spool, means whereby it may be given both axial and gyratory rotation, and means whereby gyratory rotation thereof may be suspended.

4. A fishing reel comprising, in combination, a spool, means whereby said spool may be rotated axially and simultaneously given a gyratory movement at opposite ends thereof, and means whereby gyratory movement thereof may be suspended.

5. A fishing reel comprising, in combination, a spool, means whereby said spool may be rotated axially and simultaneously given a gyratory movement at opposite ends thereof, the center of gyration being substantially midway between opposite ends of the axis of said spool, and means whereby gyratory movement thereof may be suspended.

6. A fishing reel comprising, in combination, a support, a spool, a spool carrying member having said spool rotatably mounted thereon, said carrying member being journaled in said support and having its journal movable longitudinally therein.

7. A fishing reel comprising, in combination, a support, a spool, a spool carrying member having said spool rotatably mounted thereon, said carrying member being journaled in said support and having the axis of its journal at an angle with the axis of said spool and movable longitudinally in said support.

8. A fishing reel comprising, in combination, a support, a spool, a spool carrying member having said spool rotatably mounted thereon, said carrying member being journaled in said support and movable longitudinally therein, a fixed gear mounted on said support coaxially with the journal of said carrying member, and a pinion rotatable with said member and adapted to engage with said fixed gear.

9. A fishing reel comprising, in combination, a support, a spool, a spool carrying member having said spool rotatably mounted thereon, said carrying member being journaled in said support, a fixed gear mounted on said support coaxially with the journal of said carrying member, a pinion rotatable with said member and adapted to engage with said fixed gear, and means for disengaging said pinion and gear.

10. A fishing reel comprising, in combination, a support, a spool, a spool carrying member having said spool rotatably mounted thereon, said carrying member being journaled in said support, a fixed gear mounted on said support coaxially with the journal of said carrying member, a pinion rotatable with said member and adapted to engage with said fixed gear, said member being movable longitudinally relative to its journal in a manner to disengage said pinion and gear.

11. A fishing reel comprising, in combination, a rotatable spool, means including a planetary gear whereby said spool may be rotated both axially and in a conical orbit, and means whereby a conical-orbital rotation thereof may be suspended.

12. A fishing reel comprising, in combination, a rotatable spool, means including a planetary gear whereby axial and gyratory rotation may be transmitted thereto, and means whereby gyratory rotation thereof may be prevented.

13. A fishing reel comprising, in combination, a support, a rotatable spool, a spindle having said spool secured thereto, a spool carrying member having said spindle journaled therein, said member being journaled in said support at an angle with said spindle and movable longitudinally relative to said support, a fixed gear forming part of said support and arranged coaxially with the journal of said spool carrying member, and a pinion secured to said spindle and adapted to engage with said fixed gear.

14. A fishing reel comprising, in combination, a rotatable spool, a spindle having said spool secured thereto, a support, a spool carrying member having said spool spindle journaled therein, a spindle forming part of said spool carrying member and journaled in said support and adapted to slide longitudinally, a gear secured to said support and arranged coaxially with its spindle journal, a pinion secured to said spool spindle and adapted to engage with said fixed gear when said spool carrying member is moved longitudinally in one direction, and a spring for moving said member in an opposite direction to disengage the pinion.

15. A fishing reel comprising, in combination, a rotatable spool, a spindle having said spool secured thereto, a support, a spool carrying member having said spool spindle journaled therein, a spindle forming part of said carrying member and journaled in said support and adapted to slide longitudinally, a gear secured to said support and arranged coaxially with its spindle journal, a pinion secured to said spool spindle and adapted to engage with said fixed gear when said spool carrying member is moved longitudinally in one direction, a spring for moving said member in a direction to disengage said pinion, and means for locking said member against rotation when the pinion is disengaged.

16. A fishing reel comprising, in combination, a rotatable spool, a spindle having said spool secured thereto, a support, a spool carrying member having said spool spindle journaled therein, a spindle forming part of said carrying member and journaled in a sleeve forming part of said support and adapted to slide longitudinally therethrough, a gear secured to said sleeve and arranged coaxially therewith, a pinion secured to said spool spindle and adapted to engage with said fixed gear when said spool carrying member is moved longitudinally in one direction, a clutch member secured to said carrier spindle and adapted to engage with said sleeve in a manner to lock the carrier against rotation when the gears are disengaged.

17. A fishing reel comprising, in combination, a rotatable spool, and means including a planetary gear whereby said spool may be rotated both axially and orbitally, and means for preventing orbital rotation thereof.

HENRY F. CRANDALL.

Witnesses:
W. J. CARNEY,
B. C. WAIT.